Feb. 16, 1965  B. L. ERTSGAARD ETAL  3,169,358
AUTOMATIC SAFETY SWITCH MECHANISM FOR A TRACTOR
MOUNTED ROTARY POWER MOWER
Filed Dec. 22, 1960  5 Sheets-Sheet 1

INVENTORS
BYRON L. ERTSGAARD
ROBERT M. RUBIN
BY
Williamson Palmatier
ATTORNEYS

Feb. 16, 1965  B. L. ERTSGAARD ETAL  3,169,358
AUTOMATIC SAFETY SWITCH MECHANISM FOR A TRACTOR
MOUNTED ROTARY POWER MOWER
Filed Dec. 22, 1960  5 Sheets-Sheet 3

INVENTORS
BYRON L. ERTSGAARD
ROBERT M. RUBIN
By Williamson + Palmatier
ATTORNEYS

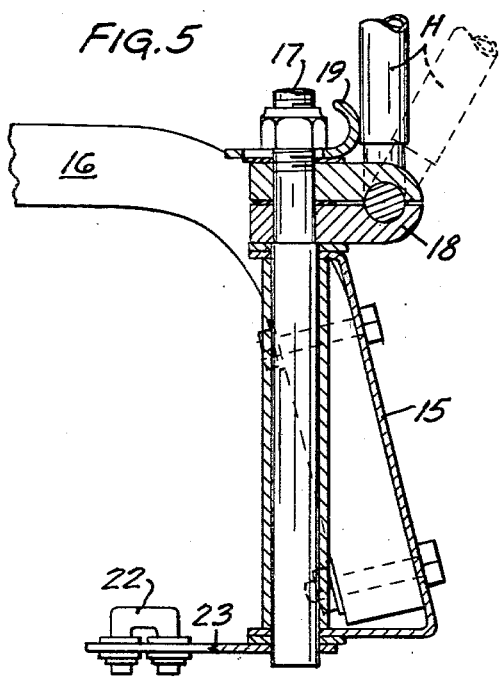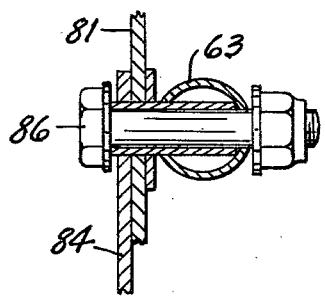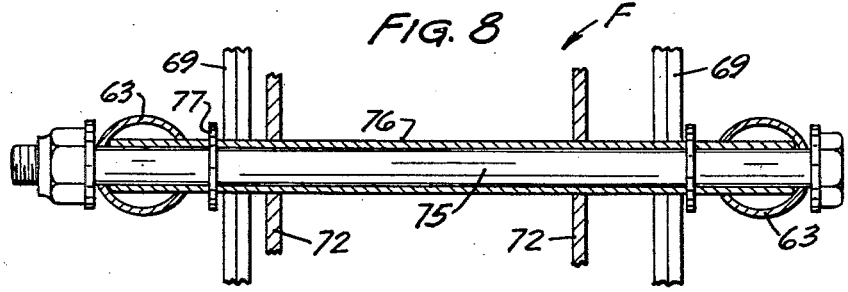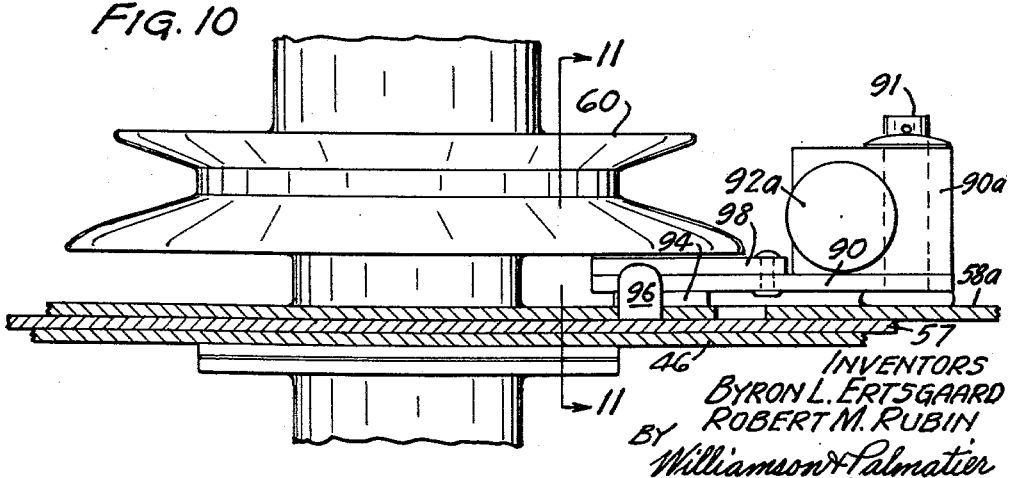

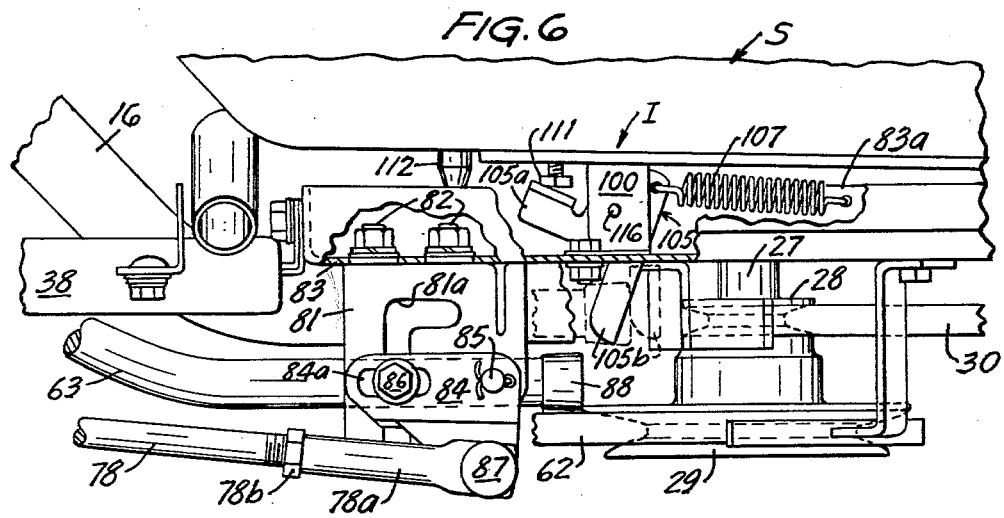
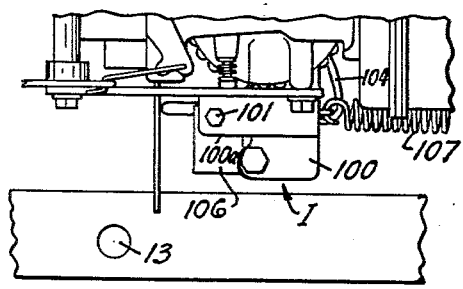
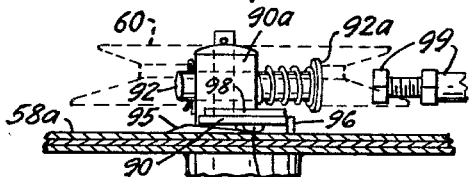
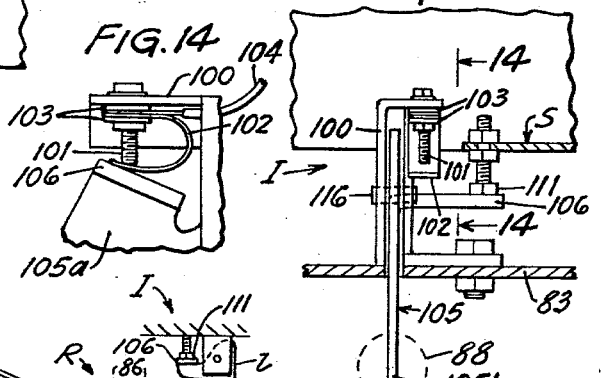
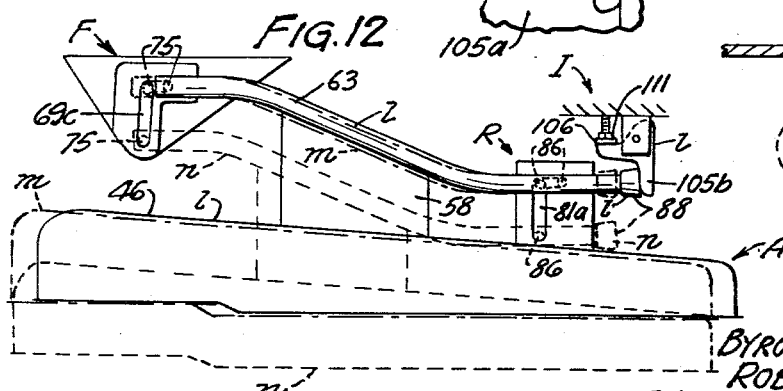

United States Patent Office 3,169,358
Patented Feb. 16, 1965

3,169,358
AUTOMATIC SAFETY SWITCH MECHANISM FOR A TRACTOR MOUNTED ROTARY POWER MOWER
Byron L. Ertsgaard, Excelsior, and Robert M. Rubin, Wayzata, Minn., assignors to Toro Manufacturing Corporation, Minneapolis, Minn., a corporation of Minnesota
Filed Dec. 22, 1960, Ser. No. 89,595
19 Claims. (Cl. 56—25.4)

This invention relates to power mowers and in particular to power mowers of the rotary cutter type in which the cutter mechanism is suspended from a self-propelled vehicle which permits operation and steering thereof by an operator seated thereupon.

Ever since the advent of the power mower, one of the paramount problems associated therewith has been that relating to the safety features thereof, since a rotary power mower is an inherently dangerous instrument, and the manufacturers and designers thereof have consistently sought to improve not only the efficiency thereof but also the safety aspects thereof to reduce the chances of harm or injury to the operator and other persons in the immediate vicinity.

Therefore, an important object of our invention is a riding type rotary mower which incorporates novel and unique safety features not previously available on prior art devices.

Another object is a riding type rotary mower of the class described which enables the cutter mechanism to be lowered and raised from and to an operative transport position through a series of intermediate elevations for selectively varying the height of cut.

Still another object is a riding type rotary mower of the class described which provides for automatic release or disengagement of the blade from the source of driving power therefor and the resultant automatic deactivation thereof when the cutter is raised to an exposed inoperative transport position.

Still another object is a riding rotary mower of the class described in which the cutter mechanism is drivingly interconnected with a common source of power which also serves to propel the vehicle upon which the cutter mechanism is mounted, and in which the cutter mechanism may be deactivated and disconnected from said source of power when in inoperative position without interfering with the operation of said source of power, thereby enabling the vehicle to continue to operate.

Still another object is a mower of the class described having a vertically movable cutter assembly which is disconnectibly interconnected with a source of power for rotating the cutter blade, the movements of said cutter assembly being controlled by a single operational lever within easy reach of an operator seated on the mower, and in which the cutter assembly automatically becomes drivingly interconnected with the source of power as the cutter assembly is lowered into cutting position and becomes automatically disconnected therefrom as the cutter assembly is raised into exposed inoperative transport position.

Still another object is a riding type rotary mower of the class described which provides for simultaneous automatic braking of the cutter blade effective with the release of the cutter blade from the drive system to enable the cutter blade to be brought to a halt almost instantaneously.

Still another object is a riding type rotary mower of the class described which enables the operator to adjust the cutter mechanism for the height of cut desired, to retract the cutter mechanism into inoperative transport position and to release the cutter blade from driving interconnection with the source of power and to apply the brake to the blade to bring the same to an almost instantaneous halt by the operation of a single control handle or lever within easy reach of the operator when seated on the vehicle.

Still another object is to provide a riding type rotary mower of the class described with a novel interlock mechanism in which the motor or engine providing the source of power for the vehicle and the cutter mechanism is automatically shut off when the operator leaves his seated position on the vehicle while the cutter is still in lowered operative position to substantially eliminate the dangers and hazards associated with getting on and off a vehicle of this type while the cutter is still operating in lowered cutting position.

A further object is to provide a novel engine interlock mechanism for a mower of the class described which is responsive to and operationally interconnected with both a resiliently mounted seat and a vertically shiftable cutter assembly, which interlock is designed to short out and stop the engine when the seat is unoccupied and the cutter is in lowered cutting position, but permits the engine to continue to run when the seat is occupied, regardless of the position of the cutter, and when the seat is unoccupied but the cutter is in raised transport position.

Still another object is a riding type rotary mower of the class described having a novel suspension system for mounting the cutter mechanism on the vehicle and which enables the cutter housing to be constructed of strong but relatively light weight material and in which the cutter housing does not function to support any of the working parts as in prior art devices.

Still another object is a riding type rotary mower of the class described in which the cutter mechanism and supporting and actuating mechanism therefor is designed as a unit which may be readily attached to or detached from the vehicles for ease in repairing, servicing, replacing or interchanging thereof with a reel type cutter unit.

Still another object is a riding type rotary mower of the class described in which the cutter mechanism is yieldingly suspended from the vehicle chassis whereby the cutter mechanism will freely rise if it encounters obstacles such as ground swells, stones or other objects which push it upwardly, thereby preventing damage to the cutter mechanism or the suspension means.

These and other objects and advantages of our invention will more fully appear from the following description made in connection with the accompanying drawings wherein like reference characters refer to the same or similar parts throughout the several views, and in which:

FIG. 5 is a sectional view on an enlarged scale taken on the line 5—5 of FIG. 2;

FIG. 6 is a side elevational view on an enlarged scale with parts broken away of the rear end portion of the vehicle and the interlock system;

FIG. 7 is a partial top plan with parts broken away of the structure shown in FIG. 6;

FIG. 8 is a vertical section taken on the line 8—8 of FIG. 4 showing the front height of cut and bell crank assembly;

FIG. 9 is a sectional view taken on the line 9—9 of FIG. 3 showing the rear height of cut and bell crank assembly;

FIG. 10 is a rear view of the brake assembly taken on the line 10—10 of FIG. 3;

FIG. 11 is a side view of an enlarged scale of the brake assembly taken approximately on the line 11—11 of FIG. 3;

FIG. 12 is a diagrammatic illustration of the relative positions of the important structure comprising the cutter suspension and the interlock system under varying circumstances;

FIG. 13 is a detail front view of the interlock switch on an enlarged scale; and FIG. 14 is a detail side view of the interlock switch on an enlarged scale with the switch closed as viewed along the line 14—14 of FIG. 13.

Figure 1:
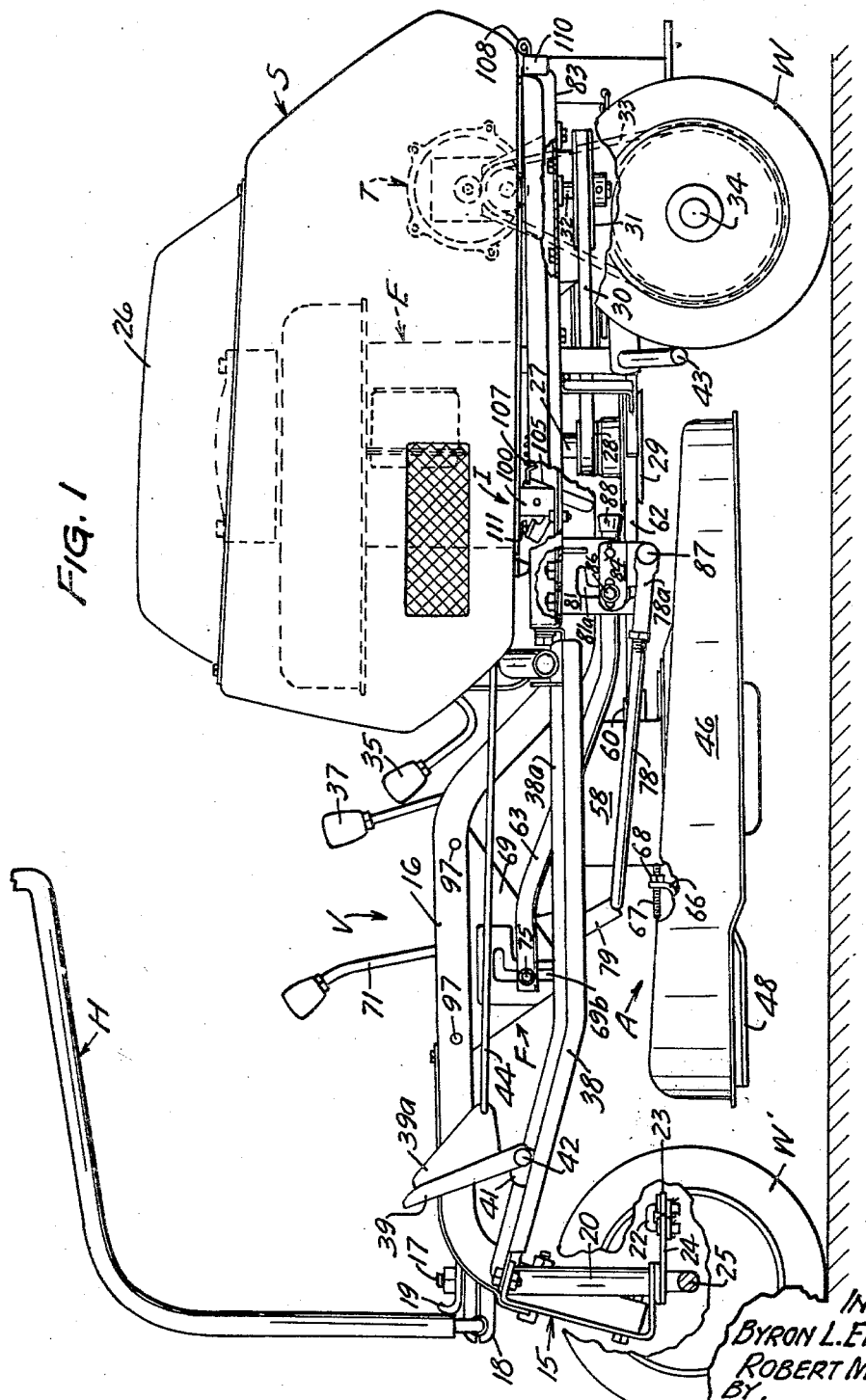
FIG. 1 is a side elevational view of the mower of our invention with portions broken away.
Figure 2:
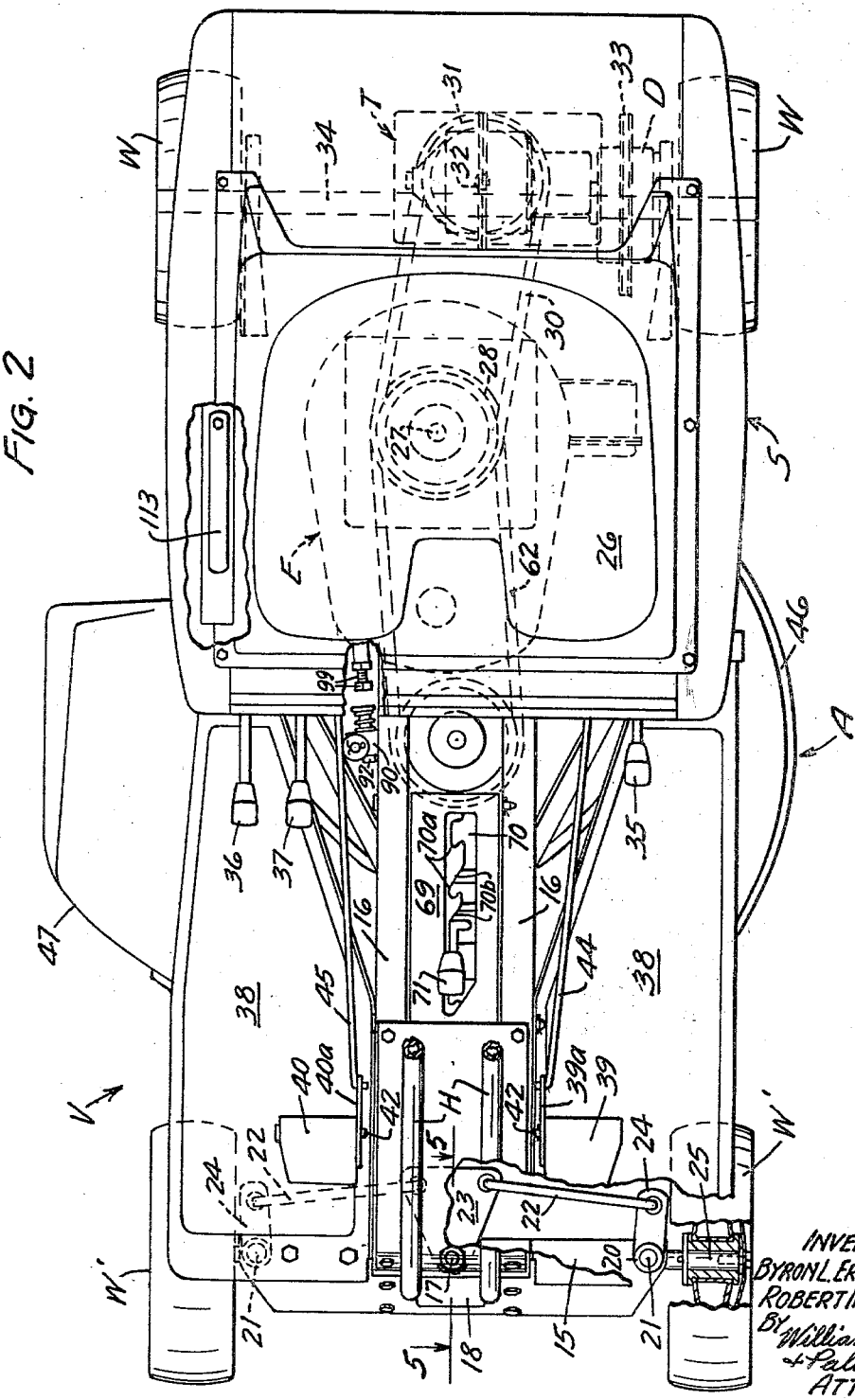
FIG. 2 is a top plan view of the mower of FIG. 1 with portions broken away.

Reference is now made to the accompanying drawings and particularly FIGS. 1 and 2 for a more detailed description of the preferred embodiment of our invention illustrated therein. The riding type rotary mower illustrated in the accompanying drawings includes a mobile tractor vehicle chassis V having a pair of rear propulsion wheels W and a pair of front steering wheels W' pivotally mounted for turning on and with respect to a front axle 15 and operated or steered by means of an upwardly and rearwardly extending steering handle H connected thereto. The front axle 15 is mounted on the forward end of an elongate longitudinally extending centrally disposed supporting frame consisting of a pair of rigid laterally spaced apart inverted generally U-shaped frame members 16, from which the cutter assembly hereinafter to be described, is suspended. The front axle 15 carries a vertically disposed rotatable steering rod 17 to which the steering handle H is drivingly connected by means of a pivot clamp 18 which is keyed to said rod, the handle being adapted for pivotal forward and back swinging movement about a horizontal transverse axis with respect to said clamp. An upturned handle stop member 19 is provided to limit the rearward movement of said handle.

The axle also carries a pair of vertical sleeves 20 within which are rotatably mounted the vertical legs of L-shaped wheel spindles 21 of the front wheel assemblies, the wheels being interconnected with the steering mechanism by tie rods 22 extending between a triangular steering arm 23 connected to the steering rod and links 24 connected to the front wheel spindles for turning movement of the wheels in response to the steering movements of the handle, the front wheels being rotatably mounted on the laterally extending leg 25 of the spindles 21.

The rear end of the chassis has mounted thereon a power unit for propelling the vehicle and driving the cutter blades, which unit includes a suitable source of power such as a gasoline engine assembly E as well as a suitable drive transmission system indicated in the entirety by T, all of which are housed and enclosed by a detachable and easily removable shroud S which has mounted atop thereof a suitable seat member 26 on which the operator sits.

The engine assembly includes a depending engine shaft 27 which carries thereon a pair of vertically spaced apart drive pulleys 28 and 29, the former transmitting driving power to the traction or propulsion wheels W through a drive belt 30 trained about the engine pulley 28 and a transmission pulley 31 carried by a depending shaft 32 of the transmission T. The transmission then transmits the driving power to the rear traction wheels W through a drive chain 33 trained about a sprocket carried by a differential gear assembly D which is drivingly keyed to the rear axle 34 upon which the rear wheels W are mounted.

The vehicle is also provided with suitable control arms or levers within easy reach of the operator for operating the power unit, including the throttle arm 35 and gear shifts or control arms 36 and 37 for shifting into forward or reverse or high and low gear respectively.

A pair of elongate longitudinally extending laterally spaced apart foot rests or floor boards 38 are mounted on each side of the front end of the vehicle chassis on opposite sides of the frame members 16, the leading ends of said foot rests being secured to the front axle 15. Foot pedals 39 and 40 are pivotally mounted on the left and right foot rests respectively by means of mounting brackets 41 and pivot pins 42, each of the pedals being provided with vertical rearwardly extending flange portions 39a and 40a respectively. The pedal 39 on the left hand side functions as a brake pedal and is interconnected with friction type brake members 43 through suitable linkage including the brake rod 44, the leading end of which is secured to the flange 39a. Thus, downward pressure applied to the brake pedal 39 causes the rod-like brake members 43 to bear against the outer peripheries of the tires on the rear wheels to bring the vehicle to a halt or slow it down. The pedal 40 on the right side functions as a clutch pedal and is interconnected with the clutch by means of a clutch rod 45, one end of which is connected to the pedal flange 40a. The inner edge portions of the foot rests are turned upwardly to provide foot abutments or rails 38a, to prevent the operator's feet from extending into the area between the foot rests and becoming involved with the portion of the cutter mechanism or assembly located therein.

Figure 3:
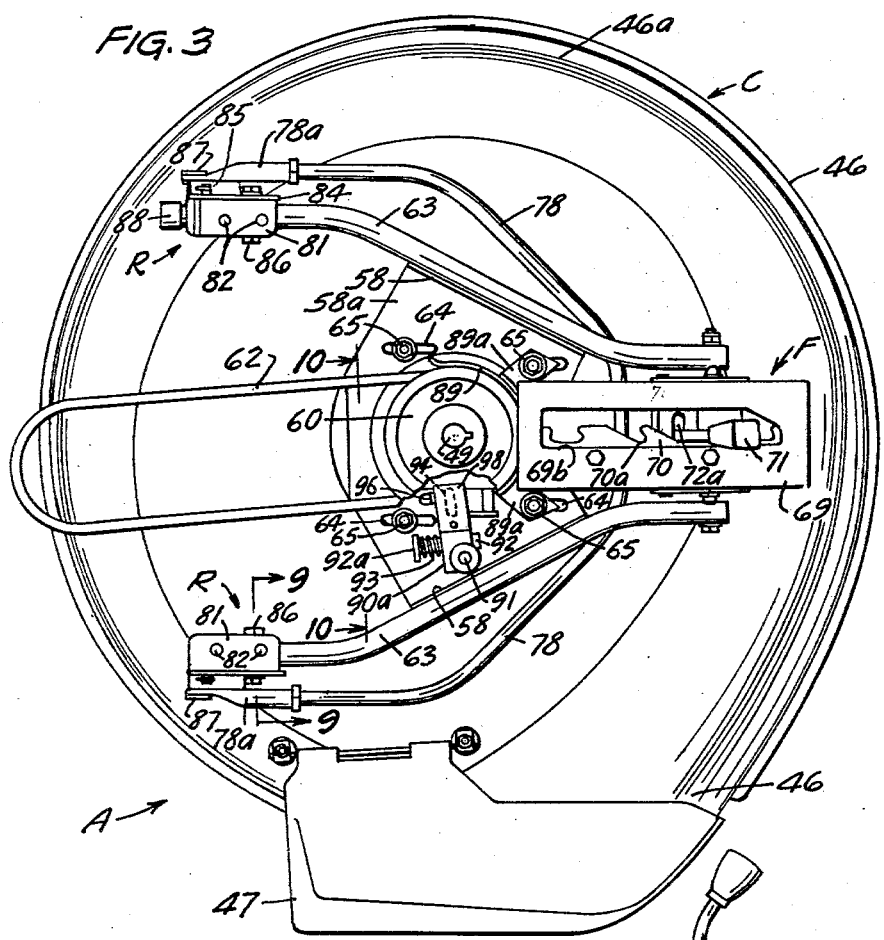
FIG. 3 is a detail top plan of the cutter assembly on an enlarged scale.

The cutter assembly A (best seen in FIGS. 3 and 4) is detachably suspended from the vehicle chassis and includes cutter supporting and actuating mechanism consisting of a single front suspension unit F, a pair of rear suspension units R, a pair of yoke arms extending between and supported by the front and rear units, and a control bail operationally linking the front and rear units together, and a rotary cutter unit C suspended from said yoke arms.

The cutter unit C includes an inverted dished housing 46 which is preferably provided with a spiral volute channel portion 46a for receiving and discharging the cuttings, which channel terminates in an enlarged discharge mouth 46a' at the right side of the cutter. A deflector 47 may be hingedly mounted on the cutter housing adjacent the discharge mouth 46a' and provide a generally rearwardly extending channel for intercepting the cuttings and any hard foreign objects discharged from the housing and directing them rearwardly, a major portion of the force of the foreign objects being spent in contacting the deflector to reduce the chance of injury resulting therefrom. A horizontally rotatable cutter blade 48 is disposed within the cutter housing and is mounted on a suitable drive spindle 49 by means of a blade retainer 50 keyed to the spindle by means of a locking collar 51 and a set screw 52. The spindle is enclosed by and journaled in a spindle bearing 54 which is housed in and supported by flanged upper and lower spindle bearing housings 55 and 55' respectively. The flange portions of the upper and lower bearing housings are fastened together by means of suitable fasteners 56, which fasteners also function to secure a re-enforcing plate 57 to the top of the cutter housing and also secure the cutter housing to the bearing housings, the top of the cutter housing being disposed between the underside of the re-enforcing plate 57 and the top of the flange of the upper housing 55. The re-enforcing plate underlies the base of a cutter housing mounting bracket 58 on which the cutter unit is detachably and adjustably mounted. The cutter unit shown is also provided with an anti-scalp cup 59 which extends beneath the lower edge of the cutter housing and blade. The drive spindle 49 extends upwardly through a suitable opening in the cutter housing and has mounted thereon in driving connection therewith the cutter drive pulley 60 which is keyed to the spindle by means of a set screw 61. The cutter drive pulley 60 is driven by means of a flexible drive belt 62 extending between and trained about cutter pulley 60 and pulley 29 caried by the engine shaft 27.

The cutter unit is suspended from a pair of laterally spaced apart longitudinally extending yoke arms 63 by means of the generally U-shaped mounting bracket 58, the upper edges of the side walls thereof being secured to said yoke arms as by welding. The base 58a of the mounting bracket 58 is provided with a pair of front and a pair of back longitudinally extending mounting slots 64 which are adapted to receive suitable fasteners such as the carriage bolts 65 which secure the cutter unit C to the mounting bracket, the slots permitting longitudinal adjustment of the cutter unit with respect to the mounting bracket. A belt adjustment bracket 66 is mounted on the front top portion of the cutter housing and is provided with an upturned apertured portion which slidably receives a forwardly extending threaded adjustment rod 67 carried by the mounting bracket 58 and is axially movable with respect thereto. The member 67 has a stop nut 68 threadedly engaged therewith which is axially adjustable on the member 67 and engages the upturned portion of the adjustment bracket 66 to permit longitudinal adjustment of the cutter unit with respect to the mounting bracket 58 to adjust the tension on the cutter belt 62. The stop nut 68 also prevents rearward movement or slippage of the cutter unit relative to the mounting bracket 58 during use, and prevents the cutter belt 62 from becoming slack.

From the foregoing description, it is apparent that we have provided a novel means for suspending the cutter unit from the vehicle chassis. The entire cutter assembly is readily attachable to and detachable from the vehicle chassis as a unit and the cutter unit is readily mounted on or dismounted from the cutter unit supporting and actuating mechanism comprising the remainder of the cutter assembly and is readily adjusted to tension the belt. In addition, the novel construction provides for the entire weight, stress and strain of the individual elements of the cutter unit other than the cutter housing to be carried and borne by the mounting bracket and chassis, rather than by the cutter housing itself as in conventional designs of the prior art. This relieves the cutter housing of any significant stress or strain and permits lighter and less expensive construction thereof.

The yoke arms 63 from which the cutter unit is suspended are in turn suspended from and between the front suspension and actuating unit F and the back suspension and mounting units R.

Figure 4:
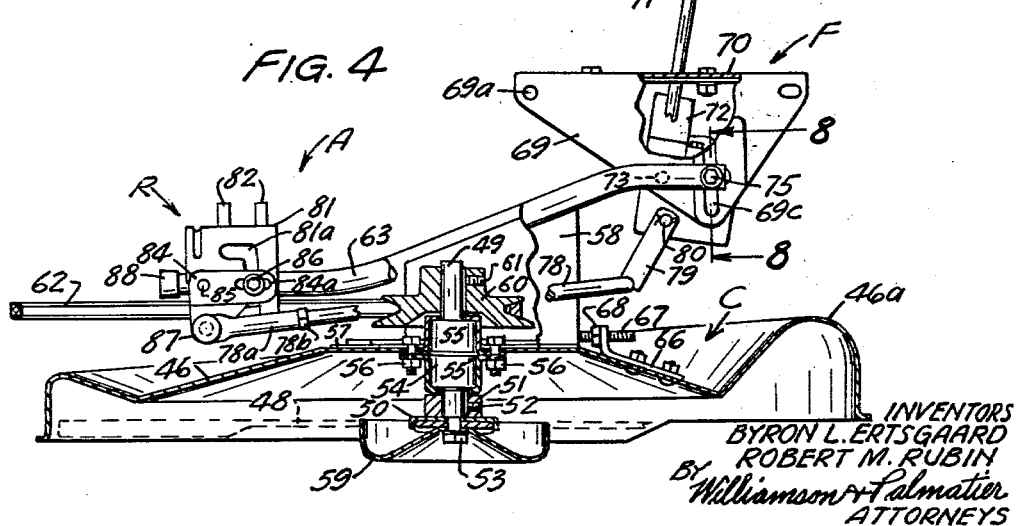
FIG. 4 is a side view of the cutter assembly of FIG. 3 partly in elevation and partly in section.

The front unit F, best seen in FIGS. 4 and 8, includes a front height of cut or suspension bracket 69 of generally inverted U-shaped cross section, as viewed from the front or back, which is adapted for detachable mounting on and between the center supporting frame members 16 of the chassis by means of suitable fastening members 97 inserted through said frame members and openings 69a in the sides of said bracket. The top of the bracket 69 is provided with an elongate cut-out portion or slot 69b and has secured thereto, beneath said slot, a selector plate 70 having a longitudinally disposed series of recesses or notches 70a provided therein for selectively receiving the height of cut operating handle 71 and maintaining the cutter unit at various selected elevations when the handle is moved forwardly or rearwardly by the operator. The forwardly disposed operating notches 70a are provided with rearwardly and outwardly inclined edge portions 70b whereby the handle is free to move rearwardly and which enables the handle 71 to be moved to the rear by simply pulling back thereon, and which enables the handle to automatically be released and shifted rearwardly if the cutter encounters an obstruction and is raised thereby, as described more fully hereinafter.

The lower end of the operating handle 71 is located within the mounting bracket and is operatively connected to an inverted channel shaped front bell crank member 72 disposed between the sides of the mounting bracket and which is pivotally mounted on a transverse pivot rod 73 supported by the bracket 69, the handle causing said bell crank to tilt forwardly or rearwardly about the pivot rod to thereby raise and lower the cutter as described hereinafter. The operating handle extends through a transverse slot 72a provided in the top of the bell crank and is adapted for free transverse or side-to-side movement with respect thereto in said slot. A return spring 74 interconnects the handle and the bell crank and is adapted to continuously bias or pull the handle to the right side or towards the selector plate to retain the handle in the notches or recesses of the selector plate and prevent accidental removal therefrom during use, but permits the handle to be easily moved to the left and away from the selector plate to disengage the control handle from the selector plate when the operator wishes to change the position of the cutter unit.

The leading ends of the yoke arms 63 are disposed outwardly of the bracket 69 and are connected to the bell crank and to each other by means of an elongate transversely disposed link member such as the cap screw 75 which extends through both of the yoke arms and is journaled in openings in both sides of the bell crank 72 to interconnect and link together the yoke arms and bell crank for simultaneous movement thereof. The cap screw is enclosed or encased by suitable spacer members 76 and cut washers 77 which limit the lateral shifting movements thereof and maintain the bell crank and the yoke arms and the mounting bracket in uniform predetermined spaced relationship.

The sides of the height of cut bracket 69 are provided with laterally aligned opposed inverted L-shaped or right angled guide slots 69b each having a vertical and a rearwardly extending horizontal component thereof which are adapted to slidably receive the link 75 interconnecting the yoke arms and the bell crank, in which slots the link is adapted to freely move in guided fashion in response to the swinging movement of the bell crank 72 provided by the longitudinal shifting movement of the operating handle 71. Thus, longitudinal movement of the link 75 in the horizontal portions of the slots 69b effects corresponding longitudinal horizontal shifting movement of the cutter unit to tighten or loosen the cutter belt and thereby drivingly engage or disengage the cutter unit from the power, and movement of link 75 in the vertical component of the slots effects corresponding vertical movement in the cutter unit to selectively vary the height thereof.

The lower end of the front bell crank 72 is pivotally connected to the bight or central portion of a rearwardly extending control bail 78 by means of a pair of upwardly and forwardly extending link members 79 connected at their lower ends to the bail and pivotally connected to the front bell crank by means of a suitable pivot pin 80 so that movement of the bell crank causes corresponding movement of the control bail. The trailing ends of the control bail are operatively connected to the rear suspension units R as set forth hereinafter.

The rear suspension and actuating units R, best seen in FIGS. 4 and 9 are similar in design and each include an inverted angle shaped height of cut rear bracket 81, the top of which has a pair of threaded fastening members 82 extending upwardly therefrom and adapted for insertion into suitable openings in the rear chassis side frame members 83 for detachable securement thereto by means of suitable nuts. A rear bell crank member 84 is pivotally secured to each of the rear height of cut brackets 81 for relative pivotal movement with respect thereto about a transverse axis by means of a suitable hinge or pivot pin 85. The bell cranks 84 and the trailing ends of the yoke arms 63 are interconnected to one another for simultaneous movement by means of suitable linkage such as the cap screw and elastic stop nut assembly 86 which is journaled in a generally forwardly extending longitudinal slot 84a in the front arm portion of the bell crank. The portions of the links or cap screws intermediate the yoke arms and the bell cranks extend through and are slidable in inverted L-shaped cutouts or right angle guide slots 81a, the guide slots 81a in the side walls of each bracket 81 corresponding to the angled guide slots 69b in the front height of cut bracket 69. The end portions of the control bail 78 are provided with axially adjustable extensions 78a which are telescopically and threadedly engaged with the main portion of the control bail by means of an adjustment nut 78b for selective adjustment of the overall length of the arms of said bail. The trailing ends of the control bail extensions 78a are pivotally and actuatingly connected to the lower arm portion of the rear bell cranks 84 by means of pivot or hinge pins 87. The trailing end of one of the yoke arms 63, (the left side yoke arm in the form illustrated) is provided with a plug button 88 for controlling the interlock system in a manner to be described in detail hereinafter.

An arcuate upstanding belt retainer 89 is mounted on the base of the cutter mounting bracket 58 by means of the aforementioned front carriage bolts 65 which also engage and secure the mounting tabs 89a of the belt retainer. The belt retainer circumscribes and encloses the front periphery of the cutter pulley 60 and confines the cutter belt 62 to the pulley groove and prevents complete disengagement thereof from the pulley and fouling thereof when the cutter unit and pulley are longitudinally moved or shifted with respect to said drive belt by movement of the operating handle 71 to selectively tension or slacken the belt to respectively activate or deactivate the cutter blade in response to the shifting movement of the cutter unit in a manner hereinafter to be described in more detail.

Thus, the leading and trailing ends of the yoke arms 63 are moved simultaneously and correspondingly by the swinging movement of the front and rear bell cranks respectively through the interconnection of the front and rear bell cranks by the control bail and the guided movement of the link members 75 and 86 in the corresponding bracket guide slots 69b and 81a respectively upon swinging movement of the front bell crank 72 caused by the longitudinal shifting movement of the height of cut or operating handle 71. This unique suspension permits and provides smooth uniform movement of the yoke arms and the cutter unit suspended therefrom and maintains the cutter unit in a horizontal position at all times.

The cutter unit and suspension and actuating mechanism therefore are so arranged that when the operating handle 71 is shifted rearwardly to the rearmost notch in the selector plate 70, the link members 75 and 86 are disposed at the back of the horizontal components of their respective guide slots, and the cutter unit is thereby in raised inoperative or transport position, with the cutter belt 62 in slack condition so that no driving power is transmitted to the cutter pulley 60 by the belt even though the engine continues to run and the vehicle continues to operate, thereby deactivating the cutter blade and permitting it to come to rest in said raised inoperative transport position.

As the handle 71 is shifted forwardly, the link members or cap screws 75 and 86 move forwardly in the horizontal component of their respective guide slots towards the vertical component, carrying the yoke arms and cutter unit forwardly therewith and thereby progressively taking up the slack in the belt 62 and tensioning same, so that when the link members reach the vertical component and the end of their horizontal travel, the belt has been tightened sufficiently to drivingly re-engage the cutter pulley and once again activate the cutter blade if the engine is still running. Thus, when the link members, yoke arms and cutter unit begin their vertical descent as dictated by the cap screws moving in the vertical components of the guide slots, the cutter pulley 60 and the cutter blade are being driven by the engine, with the operating handle being stationed selectively in any one of the forward notches in the selector plate according to the height of cut desired. It is apparent that movement opposite to that just described produces correspondingly opposite results. Vertical movement of the link members and cutter unit controls the elevation and height-of-cut of the cutter unit, and horizontal movement thereof effects driving engagement or disengagement between the cutter pulley and the cutter belt and the engine and the cutter unit. Thus, the cutter is automatically engaged and disengaged from the engine without interfering with the operation of the engine as the operating handle and cutter unit are shifted between transport and cutting position.

The mower of our invention also includes a novel brake assembly, best seen in FIGS. 2, 3, 10 and 11, for rapidly and automatically braking the deactivated cutter blade and bringing it to a stop, which assembly is mounted on the base of the cutter housing mounting bracket 58 with a portion of a brake assembly being located beneath the cutter pulley. The brake assembly includes an elongate generally transversely disposed plate-like brake arm or shoe 90 having an enlarged vertically bored head portion or sleeve 90a which is pivotally mounted for swinging movement about a vertical axis on a suitable hinge pin 91 which is mounted on the bracket base 58a. The enlarged head portion 90a of the brake arm carries a spring loaded rearwardly extending actuating pin 92 generally longitudinally disposed for sliding reciprocating movement in a transverse bore in said head and yieldingly and actuatingly interconnected with the brake arm by means of a suitably tensioned compression spring 93 helically coiled about the shank of the pin 92 and interposed between the enlarged head 92a of the actuating pin and the opposed face of the head 90a of the brake arm. The inner end of the brake arm has a depending member or cam follower 94, the bottom of the cam follower 94 being adapted to ride upon the top surface of a forwardly and upwardly inclined cam member 95. The trailing edge portion of the brake arm is adapted to butt against an upstanding stop member or lip 96 on the base of the mounting bracket 58 to limit the rearward movement of the brake arm. The top portion of the brake arm 90 located beneath the cutter pulley is provided with suitable non-metallic brake lining material 98 having a high co-efficient of friction. The inner end of the brake arm is disposed beneath the cutter drive pulleys in close spaced relation therewith, with a typical clearance of 20–30 thousands of an inch therebetween. Upon forward movement of the brake arm, the entire brake arm assembly is cammed upwardly, causing the brake lining to bear against the under surface of the pulley and quickly bring the same to a complete halt. The actuation of the brake arm is effected by the engagement of the head 92a of the actuating pin with a stop member 99 which is suspended from the chassis and which engages the head 92a of the actuating pin upon the return or rearward movement of the operating handle and cutter unit when the same is returned to deactivated inoperative transport position. As the cutter unit is shifted rearwardly, the head of the actuating pin engages the stop member as it approaches the end of its rearward travel, thereby causing the actuating pin to be pushed forwardly against the spring 93 and thereby causing the spring to exert actuating pressure against the brake arm 90 to swing it forwardly up the cam 95 against the cutter pulley thereby effecting the braking and stopping of the cutter pulley and with it the cutter blade, it being borne in mind that the rearward movement of the cutter unit has slackened the cutter belt 62 and disengaged the cutter pulley 60 from the engine immediately prior to the braking operation taking place.

Thus, to raise and deactivate the cutter unit, and stop the cutter blade, the operating handle 71 is simply pulled rearwardly from one of the forward operating positions to the rear of slot 69b in the selector plate, thereby causing the cutter unit to initially rise to a maximum height corresponding to inoperative transport position and thence to move horizontally rearwardly. As the handle and cutter unit are moved rearwardly, the cutter pulley 60 is moved towards the engine pulley 29 and the tension on the cutter drive belt progressively slackens to a point where it is no longer able to drive the cutter pulley and blade, which blade then assumes a free wheeling condition. As the handle is brought to the end of its rearward travel, the stop member 99 engages the actuating pin 92 of the brake assembly causing the forward cammed movement of the brake into engagement with the cutter pulley to bring the same to an almost instantaneous stop. Thus, when the operator leaves his seat and the vehicle, the blade is no longer turning and there is no danger of his leg, foot or clothing, or that of another person who might approach the vehicle, coming into contact with the blade and being harmed thereby. The engine may continue to run without rotating the cutter blade which enables the vehicle to carry the cutting unit when not in use from one place to another with the blade deactivated and which is also particularly advantageous in those situations where the operator must frequently temporarily dismount for one reason or another. Also, it will be noted that this novel arrangement enables the cutter unit to be automatically engaged and disengaged with the source of power, the height of cut to be selectively adjusted, and the braking of the cutter to be automatically effected by the simple manipulation of the single operating handle 71.

The foregoing description clearly sets forth the novel cutter mounting mechanism and actuating elements therefor and the important safety features related thereto which enable the cutter blade to be rendered inoperative and stopped when the entire cutting unit is raised to an inoperative position.

In addition, we have provided our mower with another very important safety feature designed to cooperate with the shiftable and adjustable cutter mechanism hereinbefore described to prevent injury resulting when the mower is left unoccupied or unattended while the cutter mechanism is in lowered normally operative position. This novel safety feature incorporates engine interlock mechanism designed to be responsive to the weight of the operator sitting on the vehicle and the relative position of the cutting mechanism so that, if the cutting mechanism is in lowered operative position, the motor will automatically shut off if the operator leaves the vehicle with the cutting mechanism in such position and yet permits the motor to continue to run if the operator is seated on the vehicle regardless of whether the cutting mechanism is in raised inoperative position or in lowered operative position, and regardless of whether the cutting unit is drivingly engaged with the engine or not.

The elements which cooperate to provide this safety interlock system and best seen in FIGS. 6, 7, 13 and 14, includes a safety interlock switch unit indicated in the entirety by I, mounted on the left side of the chassis beneath the shroud as seen in the accompanying drawings. The switch as shown in the drawings includes a mounting bracket 100 which is mounted on the chassis frame member 83, which bracket has mounted thereon the vertical machine screw 101 which is mounted upon and depends from the forwardly extending arm portion 100a of the bracket and is in circuit with the frame. A U-shaped flexible resilient strap 102 is also provided which serves as one contact element of the switch, the upper end or leg of which is mounted on the screw between two nonconductive washers 103 whereby the strap is insulated from the screw and the frame, the lower free leg of which is disposed beneath the screw and normally in spaced apart relationship with respect to the lower end or tip of the machine screw during use and out of contact therewith, the strap being wired to the engine by means of a lead 104. A bell crank type switch lever 105 is provided which is pivotally mounted within the mounting bracket by means of a roll pin 116. The forwardly extending arm portion 105a of the switch lever is provided with a transversely extending strap engaging plate 106 which serves as the other contact element of the switch and is in circuit with the frame through its supporting structure and is normally spaced from and out of engagement with said strap, the inner end portion of which is adapted to engage the strap and move the strap upwardly into engagement with the lower tip of the machine screw 101 when swung upwardly by swinging movement of the bell crank to close the switch and hold the same in that position until release, the closing of the switch short-circuiting the motor and causing it to stop immediately. The bell crank switch lever is spring loaded by means of a suitably tensioned helically coiled interlock spring 107, one end of which is connected to the upstanding apertured flange portion 83a of the chassis frame of the mower, the other end of which is connected to the upper rear portion of the switch lever to continuously pull the rear portion rearwardly and thereby continuously biasing or urging the forward end 105a of the bell crank and the strap engaging plate 106 upwardly into engagement with the strap to close the switch. The bell crank also includes a depending leg portion 105b adapted to be engaged by the aforementioned plug button 89 carried by the trailing end of one of the yoke arms in a manner and for a purpose set forth hereinafter.

Thus, in the form shown, the motor is short circuited and stopped when the plate 106 makes contact with the strap 102. However, it is apparent that if the plate 106 for any reason is not in circuit with the frame and is incapable of short circuiting and stopping the motor upon making contact with the strap, the motor will then be short circuited and stopped by the strap 102 making contact with the lower tip of the screw 101 when pressed thereagainst by plate 106, the screw 101 in such instance then serving as the other contact element of the switch.

The engine E and drive mechanism or transmission T for the mower are mounted rearwardly on the chassis frame and the majority of this mechanism is housed within and enclosed by the shroud S, with the remainder located directly thereunder, which shroud is detachably and hingedly connected to the chassis frame at the rear end thereof to permit the shroud to be swung rearwardly to expose the power plant and drive mechanism enclosed thereby. The lower rear edge of the shroud is provided with transversely disposed tubular female hinge elements 108 which are adapted to removably receive the pin type male hinge elements 109 carried by the rear chassis frame member 110 when aligned therewith and upon lateral movement of the shroud relative to the chassis, and may be completely removed from the chassis by lateral movement in the opposite direction. The front end of the shroud is resiliently mounted for swinging movement about the horizontal transverse axis provided by the hinges in the following manner. The forward end of the shroud is spring supported by means of the interlock spring 107 on one side together with a leaf spring 114 mounted on the opposite side of the chassis. The bottom of the shroud on the same side as the interlock switch (on the left side in the drawings) is provided with a depending vertically adjustable switch lever depressing member such as the cap screw 111 which extends downwardly therefrom and is threadedly engaged therewith and is adapted to engage or rest upon the outer end portion of the contact plate 106 of the bell crank and to push downwardly thereon against the tension of the interlock spring 107 and hold the plate out of engagement with the contact strap 102 to permit the motor to continue to run when the operator is seated atop the shroud. The shroud is also provided on each side with depending alignment plugs 112 which are adapted to be received in suitable openings 113 provided in the side frame members 83 of the chassis to maintain the shroud in proper alignment during use and prevent any lateral shifting movement thereof. On the other or right side of the vehicle a leaf spring 114 is provided on the underside of the side frame member 83 immediately beneath the opening receiving the alignment plug on that side, and engaged by the alignment plug to resiliently support the shroud, so that the shroud is resiliently supported by the tension supplied by the leaf spring 114 on one side and the interlock spring on the other.

Thus, the interlock spring and the leaf spring are so tensioned that the normal weight of the shroud itself absent the weight of the operator is insufficient to hold the plate 106 of the bell crank down and away from the contact strap and the interlock switch open, the springs (absent the weight of the operator on the seat) being sufficient to raise and hold the shroud S in a raised position which permits the strap engaging plate 106 to engage the strap and press it against the tip of the machine screw 101 thereby closing the interlock switch and shutting off the motor. However, the weight of an operator sitting on the seat 26 atop the shroud is more than sufficient to overcome the tension of the leaf and interlock spring and depress the contact plate 106 and hold it away from the strap to hold the interlock switch open during the time an operator is seated on the vehicle.

The trailing end of the yoke member located on the same side of the vehicle as the interlock switch (on the left side in the drawings), is provided with the rearwardly extending switch lever actuating plug button or knob 88 which is adapted to engage, swing rearwardly and hold the lower leg 105b of the switch lever when the cutter mechanism is in raised, rearwardly shifted inoperative position so as to hold the strap engaging plate 106 down and the interlock switch in open position as shown in the broken line position of FIG. 6. However, when the cutter unit is lowered to operative cutting position and drivingly engaged with the engine, the switch lever actuating knob 88 carried by the yoke is simultaneously moved forwardly and downwardly away from the bell crank leg and out of engagement therewith to assume the solid line position of FIG. 6, and the interlock switch is free to close under the influence of the interlock spring unless someone is seated on the vehicle to hold the plate 106 down and the switch open. Thus, where the cutting unit is in lowered operative position and the vehicle is unoccupied, the shroud will be raised by the action of the interlock and leaf springs, causing the plate 106 to press the strap against the screw 101 and close the switch and stop the motor. However, the switch will remain open and the motor will continue to run at all times when the operator is seated atop the shroud, regardless of the position of the cutting mechanism, the plate 106 being held down by the contact plate depressing cap screw 111. The switch will also remain open whenever the cutting unit is in raised rearwardly shifted deactivated inoperative position, regardless of whether the operator is seated on the shroud or not, the actuating knob 88 in such circumstance bearing against the lower leg 105b of the switch lever and holding same in a substantially vertical position and thereby holding down and locking the strap actuating plate 106 in an inoperative position. Thus, the interlock system and cutter assembly cooperate to insure that the cutter blade will be rotating only when it is desirable and safe to do so. When the cutter unit is in raised inoperative transport position, the blade is deactivated and brought to rest by the disengagement of the cutter from the source of power while the motor continues to run for operation of the vehicle regardless of whether the operator is seated on the vehicle or not. When the cutter is in lowered operating position, the blade is drivingly engaged with the engine but will rotate only if the operator is safely seated on the vehicle and will cease to turn as soon as the operator leaves his seat. Therefore, the blade is never rotating when the operator is getting on or off the vehicle, nor when he is standing or working alongside thereof.

FIG. 12 diagrammatically illustrates the relative positions of some of the essential elements comprising cutter assembly and the interlock system during various operational situations. The solid line position l of the various elements shown represents their relative positions with respect to each other when the cutter unit is in raised rearwardly retracted inoperative deactivated position. The link members 75 and 86 carrying the cutter supporting yoke arms 63 are disposed at the rear of the horizontal leg of their respective guide slots 72a and 81a, and the plug button 88 carried by one of the yoke arms bears against the leg 105b of the switch lever, holding the leg in substantially vertical position and holding the strap engaging plate 106 carried by the lever out of engagement with the contact strap 102 and thereby keeping the interlock switch open, regardless of whether the operator is seated on the vehicle or not.

Broken line position m illustrates the situation in which the operating handle has been shifted forwardly a sufficient distance to re-engage and drivingly interconnect the cutter unit and the engine, but in which the cutter unit has not been lowered to operative position. In this situation, the links 75 and 86 have been moved forwardly to the point of intersection between the vertical and horizontal components of their respective guide slots, the cutter has been shifted horizontally forward to the position where the slack has been removed from the cutter belt and it is in drive transmitting relationship with the cutter and engine pulleys, and the plug button 88 has been moved forwardly away from engagement with the switch lever, leaving the lever free to asssume the strap engaging switch closing broken line position shown, unless the operator is seated on the vehicle so that his weight will cause the switch lever depressing cap screw 111 carried by the shroud to hold the strap engaging plate 106 down in solid line position and thereby keep the interlock switch open.

Broken line position n of FIG. 12 shows the relative positions of the elements when the cutter unit has been lowered to operative position from the activated inoperative position m. The link members 75 and 86 have moved down the vertical component of their respective guide slots, and the plug button 88 has been lowered a corresponding distance. The switch lever is still free to swing upwardly and close the interlock switch insofar as the plug button is concerned, and the switch lever can be maintained in depressed condition and the switch kept open only by having the operator seated on the vehicle.

From the foregoing, the advantages of our invention are readily apparent. The mower which we have disclosed herein incorporates novel safety features for protecting both the operator and anyone in the immediate vicinity of the mower in a manner not previously available in prior art devices. The unique manner of mounting and operating the cutter mechanism permits the mechanism to be raised and lowered conveniently into and out of operation position, enables the cutter blade to be automatically disconnected from the drive system when in raised inoperative transport position and almost simultaneously brought to an almost immediate stop when returned from operating position to prevent any harm being done when the cutter unit is not being utilized and at the same time permits the convenient interconnection with and disconnection of the cutter blade with the source of power without interrupting the operation of the motor to permit continued operation of the vehicle itself, all of which is conveniently and simply accomplished by the manipulation of a single control handle within easy reach of the operator. The novel interlock system prevents the mower from continuing to operate when the operator is not seated on the vehicle and the blade is in lowered operating position, and cooperates with the cutter control mechanism to insure that the cutter blade will be driven only when the operator is seated on the mower and the cutter is in lowered cutting or operating position.

Thus, when the cutter is in raised retracted position, it is disengaged from the engine and deactivated, regardless of whether the operator is seated on the vehicle or not. However, when the cutter is drivingly engaged with the engine, regardless of whether the cutter is in raised inoperative position or lowered operative position, the engine will run and the cutter blade will rotate only if the operator is seated on the vehicle and if he leaves his seat for any reason the interlock switch will close and the engine will shut off, thereby deactivating the cutter blade, unless he has first raised and retracted the cutter to a safe position where the blade is deactivated by disengagement from the engine.

It is also important to note that the cutter assembly A is so designed that if, in traveling over the ground in lowered operating position, the cutter housing 46 or anti-scalp cup 59 should encounter any raised obstacle such as a ground swell, rocks, or any other object which would tend to push the cutter assembly upwardly, the entire assembly will freely yield and rise in response to this upward force to prevent any damage occurring. The operating handle 71 is free to move rearwardly out of the particular operating notch 70a of the selector plate in which it is seated, since the rearwardly and outwardly inclined portions 70b of the selector plate leading to the notches 70a permit uninhibited rearward movement of the operating handle. Thus, when an upwardly directed force is applied against the cutter housing 46, this force is transmitted through the bracket 58 to the yoke arms 63 and their slidable links 75 and 86, which thereupon move upwardly in their respective slots 69c and 81a, thereby unseating the operating handle and automatically shifting it to the rear.

It is further important to note that the interlock system shown in the accompanying drawings and described hereinbefore can be modified within the scope of this invention by eliminating the resilient contact strap 102 whereby the motor is short-circuited through the supporting chassis frame by the plate 106 making direct contact with the lower tip of the machine screw 101, the plate 106 being connected with the frame through the bell crank 105 on which it is mounted and the roll pin 116 and spring 107 which in turn connect the bell crank 105 to the chassis frame. In this situation the screw 101 would be wired to the motor by the lead 104 and insulated from the bracket 100 and the frame.

It will, of course, be understood that various changes may be made in the form, detail, arrangement and proportion of the parts without departing from the scope of our invention which consists of the matter described herein and set forth in the appended claims.

What we claim is:

1. In a power mower including a tractor and cutting mechanism suspended from said tractor, motor means for driving said cutting mechanism and tractor, power transmitting means interconnecting said motor means and cutting mechanism, means for raising said cutting mechanism from a cutting position to an elevated inoperative position whereby said movement of said cutting mechanism effects disengagement of said cutting mechanism from said motor means when in said inoperative elevated position, switch means movable between opened and closed positions and adapted to stop said motor when closed, switch holding means interconnected with said cutting mechanism for movement therewith, said switch holding means being adapted to engage and hold said switch in open position when said cutting mechanism is in elevated inoperative position and adapted to move away from and release said switch for closing when said cutting mechanism is moved to cutting position, resiliently mounted seat structure adapted to engage and hold said switch open when said seat is occupied, said seat structure being further adapted to move away from said switch means when unoccupied and thereby release said switch for closing, and means for closing said released switch.

2. In a power mower including a tractor and cutting mechanism suspended from said tractor, motor means for driving said cutting mechanism and tractor, generally horizontally disposed flexible belt drive means interconnecting said motor means and cutting mechanism for transmitting driving power therebetween, means for raising said cutting mechanism generally vertically from a cutting position to an elevated position while drivingly engaged with said motor means, means for moving said cutting mechanism at said elevated position generally horizontally to thereby slacken said drive belt and disengage said cutting mechanism from said motor means, switch means adapted for movement between open and closed position and wired to said motor means in such fashion as to stop said motor when closed, switch holding means interconnected with said cutting mechanism and movable therewith, said switch holding means being adapted to engage and hold said switch in open position when said cutting mechanism is disengaged from said motor means and is further adapted to move away from and release said switch for closing thereof when said cutting mechanism is moved generally horizontally back into driving engagement with said motor means, resiliently mounted seat structure adapted to engage and hold said switch open when said seat is occupied, and means adapted to move said seat structure away from said switch means and release the same for closing when the seat is unoccupied, and means continuously biasing said switch into closed position and causing closing thereof when said switch is released.

3. In a power mower including a tractor and cutting mechanism suspended from said tractor, motor means for driving said cutting mechanism and tractor, flexible transmission means interconnecting said cutter mechanism and said motor means for the transmission of driving power therebetween, means for moving said cutter mechanism through a path of travel including a generally vertical component and a generally horizontal component, the height of cut of said cutter mechanism being varied by the vertical component of travel, movement along the horizontal component of travel effecting disengagement of said cutter mechanism from driving engagement with said motor means, brake means adapted to brakingly engage said cutter mechanism and bring the cutter thereof to a substantially complete standstill, said brake means being actuated by the movement of said cutter mechanism along said horizontal component of travel, switch means wired to said motor means and adapted for movement between open and closed positions, and resilient seat structure movable between unoccupied and occupied position and continuously urged towards unoccupied position and adapted to cooperatively engage said switch means whereby when the seat is occupied said switch remains open and the motor continues to operate and when said seat structure is unoccupied said switch closes and the motor is thereby shut off, and means actuated by the disengaging movement of the cutter mechanism for holding said switch open when said cutter mechanism is disengaged from said motor means.

4. In a power mower including a tractor and cutting mechanism suspended from said tractor, motor means for driving said cutting mechanism and tractor, power transmitting means interconnecting said motor means and cutter mechanism, means for raising said cutting mechanism from a cutting position to an elevated inoperative position whereby said movement of said cutting mechansm effects disengagement of said cutting mechanism from said motor means when in said inoperative elevated position, brake means adapted for braking engagement with said cutting mechanism, brake actuating means adapted to actuate said brake means in response to said drive disengaging movement of said cutting mechanism, switch means movable between open and closed positions and adapted to stop said motor when closed, switch holding means interconnected with said cutting mechanism for movement therewith, said switch holding means being adapted to engage and hold said switch in open position when said cutting mechanism is in elevated inoperative position and adapted to move away from and release said switch for closing when said cutting mechanism is moved to cutting position, and resiliently mounted seat structure adapted for movement between unoccupied and occupied position, means cooperatively interconnecting said seat structure and switch means whereby said switch means is responsive to the movement of said seat structure and whereby said switch is open when said seat is occupied and is closed by the movement of said seat structure from occupied to unoccupied position.

5. In a power mower including a tractor and cutting mechanism suspended from said tractor, motor means for driving said cutting mechanism and tractor, generally horizontally disposed drive belt means interconnecting said motor means and cutting mechanism for the transmission of driving power therebetween, means for raising said cutting mechanism while drivingly engaged with said motor means from a lowered cutting position to an elevated position, means for moving said cutting mechanism generally horizontally at said elevated position to thereby effect driving disengagement of said cutting mechansm from said belt means, brake means carried by said cutting mechanism and adapted to brakingly engage said cutting mechanism, brake actuating means carried by said tractor, said generally horizontal power disengaging movement of said cutting mechanism bringing said brake means and brake actuating means into engagement with one another to thereby cause braking engagement between said brake means and cutting mechanism immediately following deactivation of said cutting mechanism by disengagement from said motor means, switch means movable between opened and closed positions and adapted to stop said motor when closed, switch holding means interconnected with said cutting mechanism for movement therewith, said switch holding means being adapted to engage and hold said switch in open position when said cutting mechanism is in elevated inoperative position and adapted to move away from and release said switch for closing when said cutting mechanism is moved horizontally and drivingly re-engaged with said drive belt means and said motor means, resiliently mounted seat structure adapted for movement between unoccupied and occupied position, means cooperatively interconnecting said seat structure and switch means whereby said switch means is opened and closed by the movement of said seat structure, said switch being moved to open position when said seat is occupied and released for movement to closed position when said seat is unoccupied.

6. In a power mower including a tractor and cutting mechanism suspended from said tractor, motor means for driving said cutting mechanism and tractor, power transmitting means interconnecting said motor means and cutting mechanism, means for disengaging said cutting mechanism from driving engagement with said motor means, switch means adapted to stop said motor when closed, seat structure movable between occupied and unoccupied position and biased towards said unoccupied position and adapted to engage and keep open said switch means when occupied, said seat structure being further adapted to release said switch means for closing thereof when unoccupied, means urging immediate closure of said switch means when released and still other means responsive to the disengagement of said cutting mechanism from driving engagement with said motor means for holding said switch open when said cutting mechanism is disengaged from said motor means and releasing said switch for closing when said cutting mechanism and motor means are drivingly engaged.

7. In a power mower including a tractor and cutting mechanism suspended from said tractor, motor means for driving said cutting mechanism and tractor, power transmitting means interconnecting said motor means and cutting mechanism, means for moving said cutting mechanism to thereby disengage said cutting mechanism from driving engagement with said motor means, switch means adapted to stop said motor when closed, switch engaging means interconnected with said cutting mechanism and responsive to the movements thereof, said switch engaging means being adapted to engage and hold said switch open when said cutting mechanism and motor means are disengaged and adapted to release said switch for closing when said cutting mechanism and motor are drivingly engaged, seat structure movable between occupied and unoccupied positions and biased towards said unoccupied position and adapted to engage and keep open said switch means when occupied, said seat structure being further adapted to release said switch means for closing when unoccupied, and means responsive to the movement of said seat structure towards unoccupied position for closing said switch when so released.

8. In a power mower including a tractor and cutting mechanism suspended from said tractor, motor means for driving said cutting mechanism and tractor, flexible belt means interconnecting said motor means and cutting mechanism for transmitting driving power therebetween, means for moving said cutting mechanism to thereby slacken said belt means and disengage said cutting mechanism from said motor means, switch means adapted to stop said motor when closed and including a pair of normally spaced apart contact elements wired to said motor and a spring loaded switch member adapted to move one of said contact elements into engagement with said other contact element to thereby close said switch and stop said motor, said switch member being continuously biased for switch closing movement, means carried by said cutting mechanism and adapted to engage and hold said switch member out of switch closing engagement with said contact element when the cutter mechanism is disengaged from said motor means and is further adapted to be moved out of engagement with said switch member when said cutting mechanism is moved into driving engagement with said motor means and thereby release said switch member for switch closing engagement with said contact element, resiliently mounted seat structure adapted to engage and hold said switch members out of switch closing engagement with said contact element when said seat is occupied, said seat structure being further adapted to move away from and release said switch member when unoccupied to release said switch member for switch closing engagement with said contact element.

9. In a power mower including a tractor and cutting mechanism suspended from said tractor, motor means for driving said cutting mechanism and tractor, and power transmission means interconnecting said motor means and cutting mechanism, means for disengaging said cutting mechanism from driving engagement with said motor means to thereby deactivate said cutting mechanism while said motor means continues to operate, brake means adapted to brakingly engage said cutting mechanism immediately following the disengagement of said cutting mechanism from driving engagement with said motor means, switch means adapted to shut off said motor when closed, resiliently mounted seat structure adapted for movement between unoccupied and occupied position, means cooperatively interconnecting said seat structure and switch means whereby said switch means is responsive to the movements of said seat structure, said switch being maintained in open position when said seat is occupied and adapted for movement to closed position when said seat is unoccupied, and still other means responsive to the disengagement of said cutter mechanism from said motor means for holding said switch open when the cutting mechanism is disengaged from said motor means.

10. In a power mower including a tractor and cutting mechanism suspended from said tractor, motor means for driving said cutting mechanism and tractor, power transmitting means interconnecting said motor means and cutting mechanism, means for moving said cutting mechanism to thereby disengage said cutting mechanism from driving engagement with said motor means to thereby deactivate said cutting mechanism while said motor means continues to operate, brake means adapted to brakingly engage said cutting mechanism, brake actuating means actuated by the power disengaging movement of said cutting mechanism to actuate said brake means immediately following disengagement of said cutting mechanism from said motor means, switch means adapted to stop said motor when closed, switch holding means interconnected with said cutter mechanism and responsive to the movements thereof, said switch holding means being adapted to engage and hold said switch open when said cutting mechanism and motor means are disengaged and adapted to release said switch for closing when said cutting mechanism and motor are moved into driving engagement with one another, resiliently mounted seat structure adapted for movement between unoccupied and occupied positions, means cooperatively interconnecting said seat structure and switch means whereby said switch means are responsive to the movement of said seat structure, said switch being maintained in open position when said seat is occupied and adapted for closing when said seat is unoccupied.

11. In a power mower including a tractor and cutting mechanism suspended from said tractor, motor means for driving said cutting mechanism and tractor, belt drive means interconnecting said motor means and cutting mechanism for transmitting driving power therebetween, means for moving said cutting mechanism to thereby slacken said belt means and disengage said cutting mechanism from said motor means, brake means carried by said cutting mechanism and adapted to brakingly engage said cutter mechanism, brake actuating means carried by said tractor, the power disengaging movement of said cutting mechanism bringing said brake means and brake actuating means into brake actuating engagement immediately following disengagement of said cutter mechanism from said motor means, switch means adapted for movement between open and closed position and adapted to stop said motor when closed, switch holding means carried by said cutting mechanism and movable therewith, said switch holding means being adapted to engage and hold said switch open when said cutting mechanism and motor means are disengaged and adapted to release said switch for closing when said cutting mechanism and motor are moved back into driving engagement with one another, and resiliently mounted seat structure adapted for movement between unoccupied and occupied position, said seat structure and switch means being adapted for cooperation with one another to control the opening and closing of said switch, said switch being maintained in opened position when said seat is occupied and adapted for closing when said seat is unoccupied.

12. In a power mower including a tractor, cutting mechanism mounted on said tractor, motor means for driving said cutting mechanism and tractor, means for drivingly engaging and disengaging said motor means and cutting mechanism, normally closed switch means adapted to stop said motor when closed, seat structure movable between occupied and unoccupied positions, means biasing said seat structure towards said unoccupied position, said seat structure being adapted to hold said switch means open when in said occupied position and release said switch means for closing thereof when in said unoccupied position, and means responsive to the disengagement of said cutter mechanism from said motor means preventing stopping of said motor means by said switch means when said cutter mechanism is disengaged from said motor means.

13. In a power mower including a tractor, cutting mechanism mounted on said tractor, motor means for driving said cutting mechanism and tractor, means for drivingly engaging and disengaging said motor means and cutting mechanism, a motor grounding circuit, normally closed switch means in said circuit adapted to stop said motor when closed, seat structure movable between occupied and unoccupied positions, means biasing said seat structure towards said unoccupied position, said seat structure being adapted to hold said switch means open when in said occupied position and release said switch means for closing thereof when in said unoccupied position, and means actuated by the disengagement of said cutter mechanism from said motor means for keeping said circuit open when said cutter mechanism and motor means are disengaged.

14. In a power mower including a tractor, cutting mechanism mounted on said tractor, motor means for driving said cutting mechanism and tractor, means operated by a movable handle for drivingly engaging and disengaging said motor means and cutting mechanism, normally closed switch means adapted to stop said motor when closed, seat structure movable between occupied and unoccupied positions, means biasing said seat structure towards said unoccupied position, said seat structure being adapted to hold said switch means open when in said occupied position and release said switch means for closing thereof when in said unoccupied position, and means responsive to the movements of said handle preventing stopping of said motor means by said switch means when said cutter mechanism and motor means are disengaged.

15. In a power mower including a tractor and cutting mechanism mounted on said tractor, motor means for driving said cutting mechanism, means for drivingly engaging and disengaging said cutting mechanism and motor means, seat structure movable between occupied and unoccupied positions and biased towards unoccupied position, a motor grounding circuit, switch means in said circuit movable between circuit closing and circuit opening positions, said seat structure being adapted to hold said switch means in circuit opening position when in said occupied position and release said switch means for movement thereof to circuit closing position when in said unoccupied position, means responsive to the movement of said seat structure towards unoccupied position for moving said switch means to circuit closing position when so released, and means responsive to the disengagement of said cutting mechanism and motor means for keeping said circuit open when said cutter mechanism and motor means are disengaged.

16. In a power mower including a tractor and cutting mechanism suspended from said tractor, motor means for driving said cutting mechanism and tractor, power transmitting means interconnecting said motor means and cutting mechanism, means for moving said cutting mechanism to thereby disengage said cutting mechanism from driving engagement with said motor means, normally closed switch means adapted to stop said motor when closed, seat structure movable between occupied and unoccupied positions, means biasing said seat structure towards said unoccupied position, said seat structure being adapted to hold said switch means open when in said occupied position and release said switch means for closing thereof when in said unoccupied position, and means responsive to the disengagement of said cutter mechanism from said motor means preventing stopping of said motor means by said switch means when said cutter mechanism is disengaged from said motor means.

17. In a power mower including a tractor and cutting mechanism suspended from said tractor, motor means for driving said cutting mechanism and tractor, power transmitting means interconnecting said motor means and cutting mechanism, means for moving said cutting mechanism to thereby disengage said cutting mechanism from driving engagement with said motor means, normally closed switch means adapted to stop said motor when closed, seat structure movable between occupied and unoccupied positions, means biasing said seat structure towards said unoccupied position, said seat structure being adapted to hold said switch means open when in said occupied position and release said switch means for closing thereof when in said unoccupied position, and means actuated by the disengaging movement of said cutter mechanism which prevents stopping of said motor means by said switch means when said cutter mechanism is disengaged from said motor means.

18. In a power mower including a tractor and cutting mechanism suspended from said tractor, motor means for driving said cutting mechanism and tractor, power transmitting means interconnecting said motor means and cutting mechanism, means for moving said cutting mechanism to thereby disengage said cutting mechanism from driving engagement with said motor means, normally closed switch means adapted to stop said motor when closed, seat structure movable between occupied and unoccupied positions, means biasing said seat structure towards said unoccupied position, said seat structure being adapted to hold said switch means open when in said occupied position and release said switch means for closing thereof when in said unoccupied position, and switch engaging means actuated by the motor engaging and disengaging movement of said cutter mechanism for holding said switch means open when said cutter mechanism and motor means are disengaged and releasing said switch means for closing thereof when said cutter mechanism and motor means are engaged.

19. The mower of claim 18, wherein said switch engaging means is connected to said cutting mechanism and movable simultaneously therewith during the motor engaging and disengaging movements thereof.

References Cited in the file of this patent

UNITED STATES PATENTS

| | | |
|---|---|---|
| 1,748,705 | Dodson | Feb. 25, 1930 |
| 2,550,999 | Hoffman et al. | May 1, 1951 |
| 2,606,626 | Meyer | Aug. 12, 1952 |
| 2,657,757 | Haynie | Nov. 3, 1953 |
| 2,949,004 | Jones | Aug. 16, 1960 |
| 2,968,902 | Brown | Jan. 24, 1961 |
| 2,972,850 | Ariens et al. | Feb. 28, 1961 |